(12) United States Patent
Döring et al.

(10) Patent No.: US 8,236,249 B2
(45) Date of Patent: Aug. 7, 2012

(54) PARTICLE SEPARATOR AND METHOD FOR REMOVING PARTICLES FROM AN EXHAUST GAS STREAM OF AN INTERNAL COMBUSTION ENGINE

(75) Inventors: Andreas Döring, München (DE); Marco Tilinski, Schwaig (DE)

(73) Assignee: MAN Truck & Bus (DE)

( * ) Notice: Subject to any disclaimer, the term of this patent is extended or adjusted under 35 U.S.C. 154(b) by 487 days.

(21) Appl. No.: 12/487,530

(22) Filed: Jun. 18, 2009

(65) Prior Publication Data

US 2009/0313978 A1 Dec. 24, 2009

(30) Foreign Application Priority Data

Jun. 21, 2008 (DE) .......................... 10 2008 029 520

(51) Int. Cl.
*B01D 50/00* (2006.01)
(52) U.S. Cl. ........................................................ 422/170
(58) Field of Classification Search .................. 422/170, 422/177, 180
See application file for complete search history.

(56) References Cited

U.S. PATENT DOCUMENTS

| 2,372,316 | A |   | 3/1945 | Curtis et al. |
|-----------|---|---|--------|---------------|
| 4,351,811 | A |   | 9/1982 | Matsuda et al. |
| 4,665,051 | A | * | 5/1987 | Nonnenmann ............... 502/439 |
| 4,823,549 | A |   | 4/1989 | Moser |
| 4,902,487 | A |   | 2/1990 | Cooper et al. |
| 2004/0013580 | A1 |   | 1/2004 | Bruck et al. |
| 2007/0207336 | A1 | * | 9/2007 | Bruck et al. .................. 428/593 |

FOREIGN PATENT DOCUMENTS

| DE | 10153283 | 5/2003 |
|----|----------|--------|
| DE | 10153284 | 5/2003 |
| EP | 0830566 | 5/1998 |
| EP | 1072765 | 6/2004 |
| GB | 895990 | 5/1962 |

* cited by examiner

*Primary Examiner* — Tom Duong
(74) *Attorney, Agent, or Firm* — Robert W. Becker

(57) ABSTRACT

A particle separator and method for removing particles from an exhaust gas stream of an internal combustion engine. A prescribed number of flow cells are formed in the particle separator. The exhaust gas stream flows into and/or out of the flow cells via, as viewed in a main direction of flow of the exhaust gas stream, side wall regions of the flow cells. At least one storage space is formed in the flow cells for storing particles removed from the exhaust gas stream, which flows through at least portions of the particle separator.

29 Claims, 6 Drawing Sheets

PARTICLE SEPARATOR AND METHOD FOR REMOVING PARTICLES FROM AN EXHAUST GAS STREAM OF AN INTERNAL COMBUSTION ENGINE

BACKGROUND OF THE INVENTION

The present invention relates to a particle separator for removing particles from an exhaust gas stream of an internal combustion engine. The present invention also relates to a method for removing particles from an exhaust gas stream of an internal combustion engine.

During combustion in a diesel engine, and also during direct injection with a spark ignition engine, emissions of particles occur that among other reasons result due to the incomplete combustion of the fuel, and predominantly comprise carbon black. To burn this carbon black, GB 895,990 A proposes burning or treating them with $NO_2$ as oxidizing agent instead of oxygen.

It is furthermore known from U.S. Pat. No. 4,902,487 to separate off carbon particles at a filter, and to subsequently oxidize the particles with $NO_2$. To produce the $NO_2$ pursuant to DE 28 320 02, for example, the NO contained in the exhaust gas stream of the internal combustion engine can be oxidized on a platinum-containing catalyst to form $NO_2$. The proportion of $NO_2$ in relationship to the total $NO_x$ is thereby significantly increased, whereby this reaction occurs starting at approximately 180° C. In contrast, the combustion of the particles by $NO_2$ begins at temperatures starting at 250° C. A particle oxidation in the gas phase practically does not occur. For this purpose, a deposition on a solid material is necessary in order to ensure an adequate retention time, which is generally realized by the use of a particle filter.

A significant drawback of such a procedure, however, is the high exhaust gas counter pressure that is caused by the filter. This becomes noticeable by an increased fuel consumption. In addition, during the operation non-combustible constituents are also deposited on the filter, such as lubricating oil ash. As a result, the exhaust gas counter pressure continuously increases, so that the filter must be regularly and frequently replaced in order to avoid an even greater fuel consumption, and possibly also damage to the internal combustion engine. Furthermore, insufficient oxidation can result in an ever increasing coating with soot, which can ultimately lead to clogging of the filter.

To avoid these drawbacks, it is already know from EP 1 072 765 B1 to use a particle separator that has no filter, whereby the exhaust gas stream is guided along a structural surface and is constantly deflected, in order to be able to remove or separate very fine particles out of the exhaust gas stream, in particular by diffusion. However, the drawback of this is that due to the constantly changing exhaust gas temperatures and the constantly changing $NO_x$ raw emissions of intermittently operated internal combustion engines, as is the case with motor vehicles, there is often insufficient $NO_2$ available for oxidizing the removed soot. This means that the particle separator must store the particles for a sufficient length of time until at a later point in time sufficient $NO_2$ is present for the oxidation of the removed soot. To ensure this, it is proposed in DE 101 53 284, in DE 101 53 283, and in DE 201 178 73 U1 to store the removed particles in a fleece or fiber layer. However, the quantity of particles that can be stored in this manner is relatively small due to the small volume of the fleece. Furthermore, the manufacture of the fleece is very expensive.

In contrast, it is an object of the present invention to provide a particle separator, as well as a method, for removing particles from an exhaust gas stream of an internal combustion engine, by means of which particles can be reliably removed from the exhaust gas stream in a straightforward manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
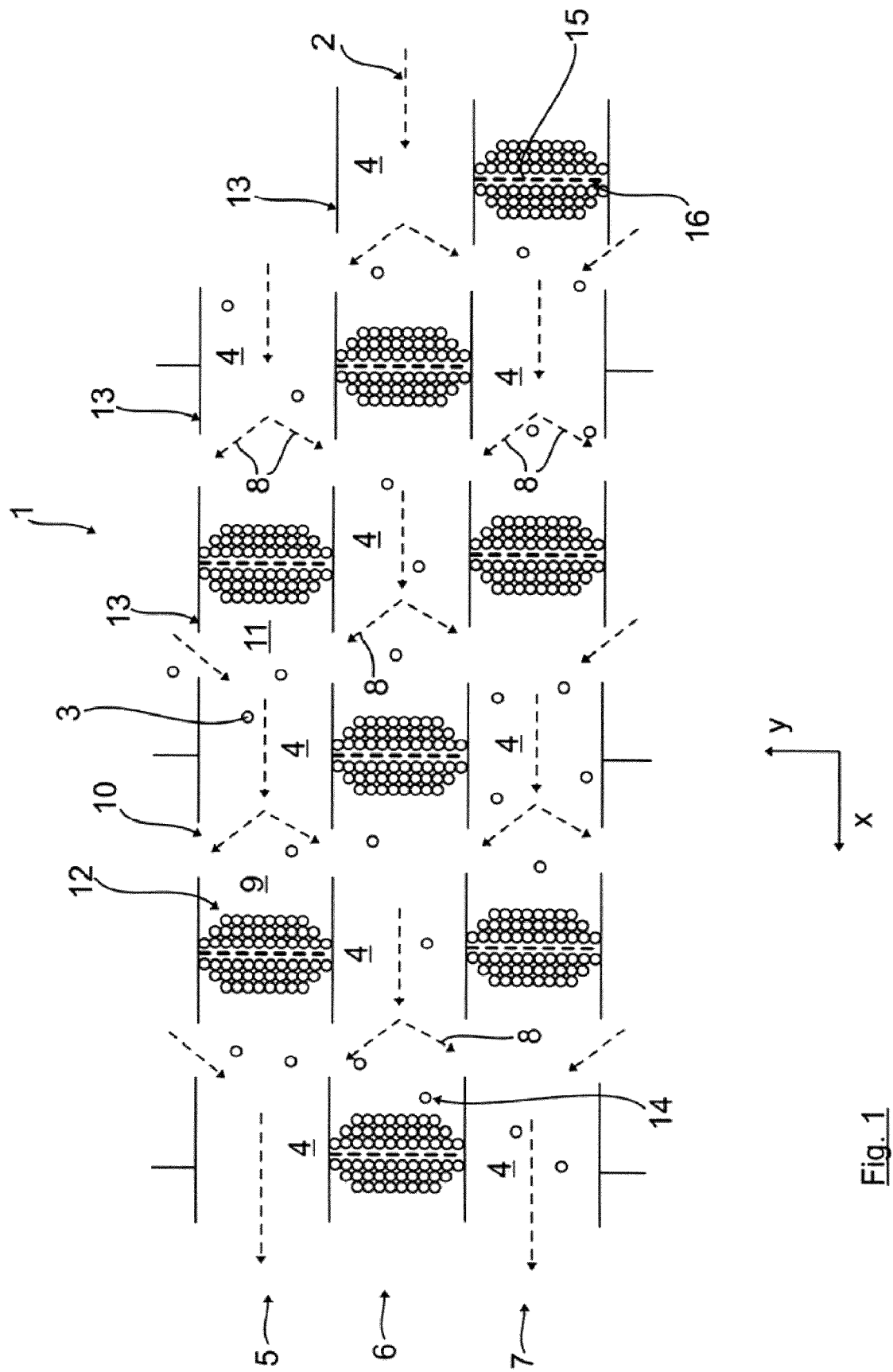
FIG. 1 is a schematic plan view onto a portion of an inventive particle separator that here has flow cells with an essentially identical configuration.

The object of the present invention is realized by a particle separator having a prescribed number of flow cells, wherein the exhaust gas stream flows into and/or out of the flow cells via, as viewed in a main direction of flow of the exhaust gas stream, side wall regions of the flow cells; at least one storage space is formed in the flow cells for storing particles removed from the exhaust gas stream, which is adapted to flow through at least portions of the particle separator. For such a flowing in and/or out of the exhaust gas stream via a side wall of a flow cell, in particular via at least one flow-through opening formed in such a side wall of a flow cell, in a functionally reliable and straightforward manner, on the one hand, a constant deflection or shunting of the exhaust gas stream within the particle separator, or the splitting of the exhaust gas stream into a plurality of individual partial exhaust gas streams, can be effected, whereby flow dead zones and/or turbulence are produced by means of which a removal of the particles of an exhaust gas stream can then be established in a straightforward manner. In this connection, pursuant to the present invention the collection or temporary storage of the particles occurs in the storage space or flow dead zones formed by the flow cells themselves, which spaces and dead zones form areas or zones that due to the side flow-through openings are decoupled from the stream in the flow cells, and in which no or at most a low flow velocity exists, but which represent a sufficiently large space in order to be able to collect the particles at that location.

Within the context of the present application the term side wall means, relative to the main direction of flow, the side wall region that in particular is oriented essentially parallel to the main direction of flow. In contrast thereto, the cell walls that are formed transverse to the main direction of flow, predominantly for a better differentiation, form base or end walls.

The particle separator preferably has a plurality of flow cells that in particular as viewed in the main direction of flow of the exhaust gas stream, are disposed one after the other and/or next to one another and/or one above the other. These flow cells, as viewed in a cross-section through the particle separator, form a type of honeycombed profile. With such a plurality of individual flow cells, a particularly effective deflection of the exhaust gas stream, accompanied by the formation of flow dead zones and/or turbulence zones, is possible, which in turn leads to an effective separation or removal of particles, in particular of very fine particles by diffusion into the storage space.

As already previously indicated, the storage space of each storage or flow cell is preferably formed by at least one blind-end bore type clearance volume space, in particular by at least one blind-end bore type flow cell channel portion. These storage spaces are easy and hence economical to produce.

The flow cells, in a prescribed portion of the side wall, preferably have at least one flow-through opening that forms intake and/or discharge openings. In this connection, each flow cell preferably has at least one flow-through opening for each flow cell that adjoins a side wall region. In particular, flow cells that are adjacent to one another in the main direction of flow are preferably offset relative to one another such that a discharge opening of a first flow cell forms an intake opening of a second flow cell.

As viewed in the main direction of flow of the exhaust gas stream, the blind-end bore type clearance volume space is formed in at least one front end portion of each flow cell, whereby this blind-end bore type clearance volume space, as viewed in the main direction of flow of the exhaust gas stream, is additionally disposed upstream and/or downstream of the at least one flow-through opening. In this way, the storage space for the particles that are to be removed in the individual flow cells can be formed in a structurally straightforward manner.

Pursuant to a preferred concrete embodiment, the blind-end bore type clearance volume space is formed by a baffle base wall that is oriented essentially perpendicular to the main direction of flow and that thus forms a base or end wall of the flow cell that is essentially oriented perpendicular to the main direction of flow.

The oxidation of the removed, carbon-containing particles can be effected or accelerated by raising the exhaust gas temperature and/or with the aid of $NO_2$ formed on a catalyst for the oxidation of NO.

A large quantity of particles, especially soot, can be collected in the aforementioned blind-end bore type clearance volume spaces. However, the $NO_2$ required for the oxidation of the particles mainly enters the clearance volume spaces by the relatively slow diffusion process. As a result, due to a localized lack of $NO_2$, the particle oxidation is relatively poor in the, for example, blind-end bores, as storage spaces, due to the too slow supply of nitrogen dioxide. It is therefore expedient to convey a small portion of the $NO_2$-containing flow in the form of a bypass through the, for example, blind-end bore as storage spaces. However, in doing so care must be taken that the flow velocity does not become too high in order to prevent the collected particles from being blown out. The bypass flow can be realized by perforating the wall region of the storage space and/or by using a porous material. In particular, in conjunction with the perforation of the storage space, which is, for example, embodied as a blind-end bore, it has been shown to advantageous to allow not more than 30% of the exhaust gas stream of a respective flow region to flow out of the, for example, blind-end bores in order to prevent the particles that are removed at this location from being churned up.

In principle, all or at least a large prescribed portion of the flow cells in a particle separator can essentially be embodied in the same manner, especially with regard to their configuration or shape and/or size. This can ensure that essentially always the same flow conditions are formed in each flow cell.

Alternatively, however, flow cells can also be provided that differ with regard to the flow conditions, in particular with regard to the flow velocity and/or the retention time of the exhaust gas stream in the respective flow cell in order to remove particles having different, defined orders of magnitude in the then differing flow cells, which can, for example, have differently sized free flow cross-sections. With such differing flow cells differing flow regions are thus formed, for example flow dead zones or turbulence zones that ensure the removal of the very fine particles by diffusion, whereas in other, preferably spatially separated, regions the flow velocity of the exhaust gas stream is increased to such an extent, and this exhaust gas stream is subsequently abruptly deflected in such a way, that due to their higher mass moment of inertia the heavier particles can no longer follow the exhaust gas stream in the region of the deflection and essentially continue to flow straight ahead. Downstream of this deflection for example the storage spaces are then provided in which the particles can then be collected.

The particle separator is preferably accordingly provided with means for repeatedly deflecting the exhaust gas stream in the particle separator and/or for dividing the exhaust gas stream into partial exhaust gas streams and/or for accelerating the exhaust gas stream and/or for slowing the exhaust gas stream down, in order to be able to ensure the most different requirements for particle removal in conjunction with the inventive particle separator. Various possibilities exist to accomplish this. A particularly economical construction of the particle separator results if it is formed as a plate separator composed of a plurality of separator plates that are interconnected in superimposed layers, and that form a set of plates. The differing flow regions and/or the deflection regions and/or the separation regions and/or the collection regions and/or the storage regions and/or the flow-through openings can, in this connection, viewed entirely in general be formed in a straightforward manner by material shaping and/or material deformation and/or material stamping and/or material recesses at prescribed regions of at least a portion of the separator plates of a set of plates. For this purpose, it is advantageous if at least a portion of a set of plates have an essentially identical configuration, although this is not absolutely necessary. The individual separator plates are particularly advantageously formed by foils and/or mats having a prescribed thickness. Such foils and/or mats can be very easily shaped, for example such that at least one of the foils is wave-shaped or corrugated, whereby the term "corrugated or wave-like configuration" is here to be understood in a broad sense, and in particular also includes shapings or the like that are folded or bent in an accordion-like manner. With such corrugated, for example foils, as separator plates, it is possible in combination with further separator plates embodied, for example, as foils to form in a straightforward manner the appropriately desired number and geometry of flow channels of the particle separator. By providing constrictions or indentations having the same or different corrugation or wave amplitudes (height) and/or different or the same corrugation frequencies (number of corrugations), it is possible in a relatively straightforward manner to alter the free flow cross-section and hence the flow velocity, or to achieve a deflection, or individual regions can be completely separate from the flow, in order to provide, for example, the desired storage spaces or dead zones. In this connection, it can be particularly advantageous, when viewed in the direction of flow, for successive constrictions to constrict the corrugated profile alternatingly first from the upper side and then from the underside. In addition, relative to different plate planes, the constrictions can also be offset relative to one another, for example such that the constrictions relative to adjacent plate planes are offset relative to one another by half of the spacing between the constrictions.

Furthermore, such separator plates formed by, for example, foils and/or mats can be easily perforated, thus enabling a transition into adjacent flow channels.

It is particularly advantageous to alternatingly arrange, for example foils as separator plates, with different amplitudes and/or frequencies of the corrugation or bends, so that regions having different flow cross-sections, in other words different cell densities and hence different flow velocities, result. If the foils form, for example, parallel flow channels, a smooth layer should be provided as an intermediate layer in order to prevent the corrugated foils from slipping into one another. It is, of course, also possible to alter the amplitude and/or frequency or bend along the separator plate, for example a foil.

The separator plates, can, for example, be produced from a ceramic and/or metallic and/or silicon-containing and/or silicon carbide-containing and/or quartz-containing and/or fibrous material. In this connection, at least portions of the separator plates can be provided with a surface structure having a defined, in other words prescribed roughness or peak-to-valley height, for example by means of mechanical processing, which will be described in detail subsequently. The transition into the individual regions, in particular the flow-through opening to the adjacent flow cells, can be effected by providing the, for example foils and/or mats as separator plates, with perforations and/or slots.

As already described above, the oxidation of the separated-off or removed, carbon-containing particles can be effected or accelerated by raising the exhaust gas temperature and/or with the aid of $NO_2$ formed on a catalytic converter or catalyst for the oxidation of NO. Due to the changing or sometimes too low exhaust gas temperatures, and the changing $NO_x$ raw emissions, especially with intermittently operated internal combustion engines, it is not always possible to immediately oxidize the soot obtained at any point in time with the aid of high exhaust gas temperatures and/or $NO_2$. This means that the separator must store the particles for a sufficient length of time until later sufficient $NO_2$ is present for the oxidation of the removed soot. This can be realized, for example, by improving the adhesion of the particles on the surface of the particle separator or the separator plates. For this purpose, surfaces having a high degree of roughness should be used. For metal foils, this means that they could be roughened, for example by mechanical processing. This can take place, for example, by brushing, grinding, scouring, radiation or blasting (e.g. sandblasting), corona irradiation or blasting, stamping or needling. A chemical treatment is also conceivable, such as etching, galvanizing or eloxadizing. In addition, the alloy of the, for example foil as separator plate, can be tailored in such a way that the surface structure thereof changes under the effect of heat and/or by variation of the pH value. One example of this is the addition of greater quantities of aluminum, which migrates at high temperatures along the surface, where it forms aluminum clusters.

Pursuant to a further particularly preferred embodiment of the invention, the particle separator can be catalytically active in at least portions thereof, in particular being coated with a catalytically active coating.

In conjunction with a concrete configuration, it is particularly advantageous to dispose the at least one particle separator together with at least one catalytic converter in a muffler of an exhaust gas unit.

Further specific features of the invention will be described in detail subsequently.

DESCRIPTION OF THE SPECIFIC EMBODIMENTS

Referring now to the drawings in detail, FIG. 1 schematically shows a parallel section through at least a portion of an inventive embodiment of a particle separator 1, and hence is quasi a plan view onto a specific portion of the particle separator 1, illustrating in principle the flow of the exhaust gas stream 2 in conjunction with the separation or removal of, for example, very fine particles 3 out of the exhaust gas stream. The direction of flow x here corresponds to the main direction of flow of the overall exhaust gas stream, regardless of eventual deflections or diversions.

The particle separator 1 is provided with a plurality of flow cells 4, which are here, by way of example only embodied essentially identically. The flow cells 4 are disposed in a plurality of rows 5, 6 and 7 that are arranged next to one another, and are also respectively disposed one after the other. The flow cells 4 of two adjacent rows 5, 6, 7 are offset relative to one another in such a way that partial exhaust gas streams 8 from a central to rear flow region portion 9 of each flow cell 4, as viewed in the direction of flow x, flow via side flow-through openings 10, as viewed in the direction of flow x, into a forward to central flow region portion 11, as viewed in the direction of flow x, of adjacent flow cells 4 of the rows 5, 6 and 7. Accordingly, the rear flow-through openings 10, as viewed in the direction of flow x, respectively form the discharge openings for the partial exhaust gas streams 8, while the forward flow-through openings 10, as viewed in the direction of flow x, form the intake openings. In this connection, relative to a flow cell 4, the shape and/or size of the forward flow-through openings can differ from the shape and/or size of the rear flow-through openings. Similarly, the shape and/or size of the flow-through openings and/or of the flow cells and/or of the storage volume for the particles can vary along the direction of flow x, as a result of which the separation or removal characteristic along the flow, and hence between the separator inlet and outlet, can vary.

As can further be seen from FIG. 1, as viewed in the direction of flow x upstream or downstream of the flow-through openings 10, in other words in the end region of the respective chamber-like flow cells 4, so-called blind-end bores 12 are formed and provided, and make available a type of clearance volume space. The manner of operation of the inventive particle separator 1 will now be described in detail with the aid of FIG. 1.

The partial exhaust gas streams 8 flow through the flow-through openings 10, which are disposed in side wall regions 13 of each flow cell 4 as viewed in the main direction of flow x. Again as viewed in the direction of flow x, the partial exhaust gas streams 8 flow through the flow cells 4 and hence through the particle separator 1 under constant deflection of the partial exhaust gas streams 8, which due to a defined, prescribed free flow cross-sectional area in the flow cells 4 have such a flow velocity in the region of the flow-through openings 10 that the flow velocity in the region of the end blind-end bore 12 is reduced to such an extent that very fine particles 3 having a specific, prescribed mass and/or size can diffuse away from the exhaust gas stream 2 into the blind end bores 12 of the respective flow cells 4, where they are temporarily stored. This very fine particle diffusion is designated by the reference numeral 14. Alternatively, or in addition thereto, the flow cross-sectional areas of the flow cells 4 can also be designed in such a way that the exhaust gas stream in the flow cells 4 is accelerated to such a flow velocity that the abrupt, sharp deflection of the exhaust gas stream caused by the flowing of the partial exhaust gas steams 8 out of the side flow-through openings 10 leads, for example, to also coarse or large particles having a defined mass and/or size no longer remaining in the partial exhaust gas streams 8 due to their mass moment of inertia, but rather continuing to travel straight ahead and to be collected by the blind-end bores 12, where they can be temporarily stored.

As is schematically indicated in FIG. 1, the baffles 15 that form the bases of the blind-end bores 12 can be perforated, whereby the gas permeability is preferably set by means of these perforations 16 in such a way that at most 30% of the exhaust gas stream in the respective flow cells 4 can escape from the flow cells through the baffle 15. Alternatively, the baffles 15, or also further regions of the flow cells 4, can be formed of a gas permeable material, and in particular at least portions thereof.

Figure 2:
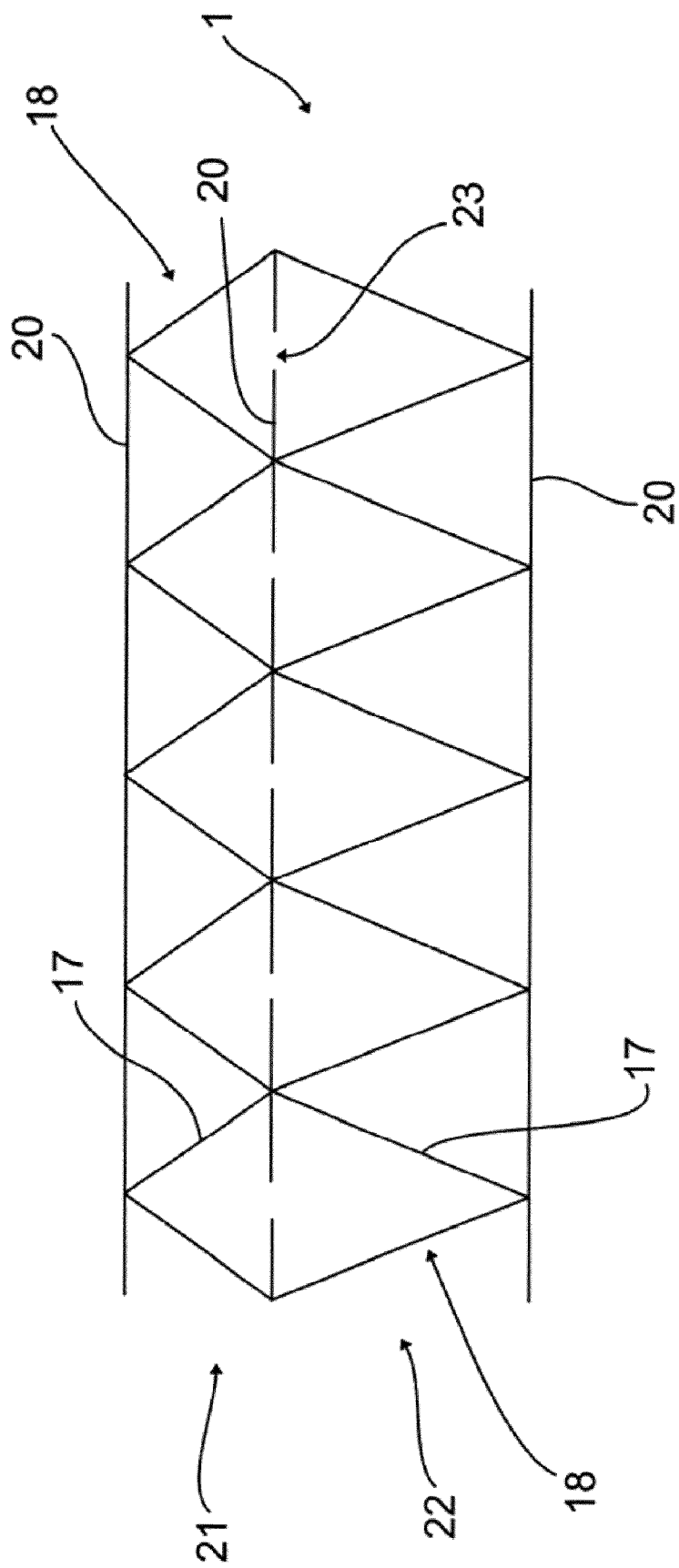
FIG. 2 is a cross-section through an exemplary embodiment of an inventive particle separator that, by way of example only, is provided with two superimposed corrugated layers having different amplitudes, i.e. corrugation heights, yet having the same frequency, whereby a smooth layer is provided between the two corrugated layers.

As can be seen in particular in FIG. 2, the particle separator 1 is preferably embodied as a plate separator composed of a plurality of superimposed separator plates that form a set of plates and that are interconnected in superimposed layers. As an illustration, a cross-section through one set of plates is selected, whereby the direction of flow x is into the drawing plane. The plate planes can be embodied in a planar manner or also in a curved manner, in particular if the plates are rolled up to form a set of plates.

A portion of the separator plates is formed by thin dimensionally stable metal sheets or foils 17 that, when viewed along the direction of flow, form a corrugated profile 18 and hence form a corrugated layer.

As can furthermore be seen from FIG. 2, in addition to the metal foils 17, which have a corrugated profile 18, so-called smooth or even layers can also be provided as separator plates that here are formed by a smooth metal sheet or foil 20, and that alternate with the metal foils 17 that have a corrugated profile 18. These smooth metal foils 20 ensure that the two metal foils 17, which have a different corrugated profile 18 and thus form different corrugated layers 21 and 22, cannot slip into one another. Flow-through openings 23 can also be formed in the smooth layer formed by the smooth metal foils 20. As can furthermore be clearly seen from FIG. 2, the corrugated layers 21, 22 can have a comparable wave or corrugation frequency, yet different corrugation amplitudes, i.e. corrugation heights, as a result of which different flow velocities occur in the different regions.

To improve the adhesion of the particles to the surface, all of the metal foils 17, 20 can be provided with a high surface roughness and/or can be coated with a catalytically active coating.

Figure 3:
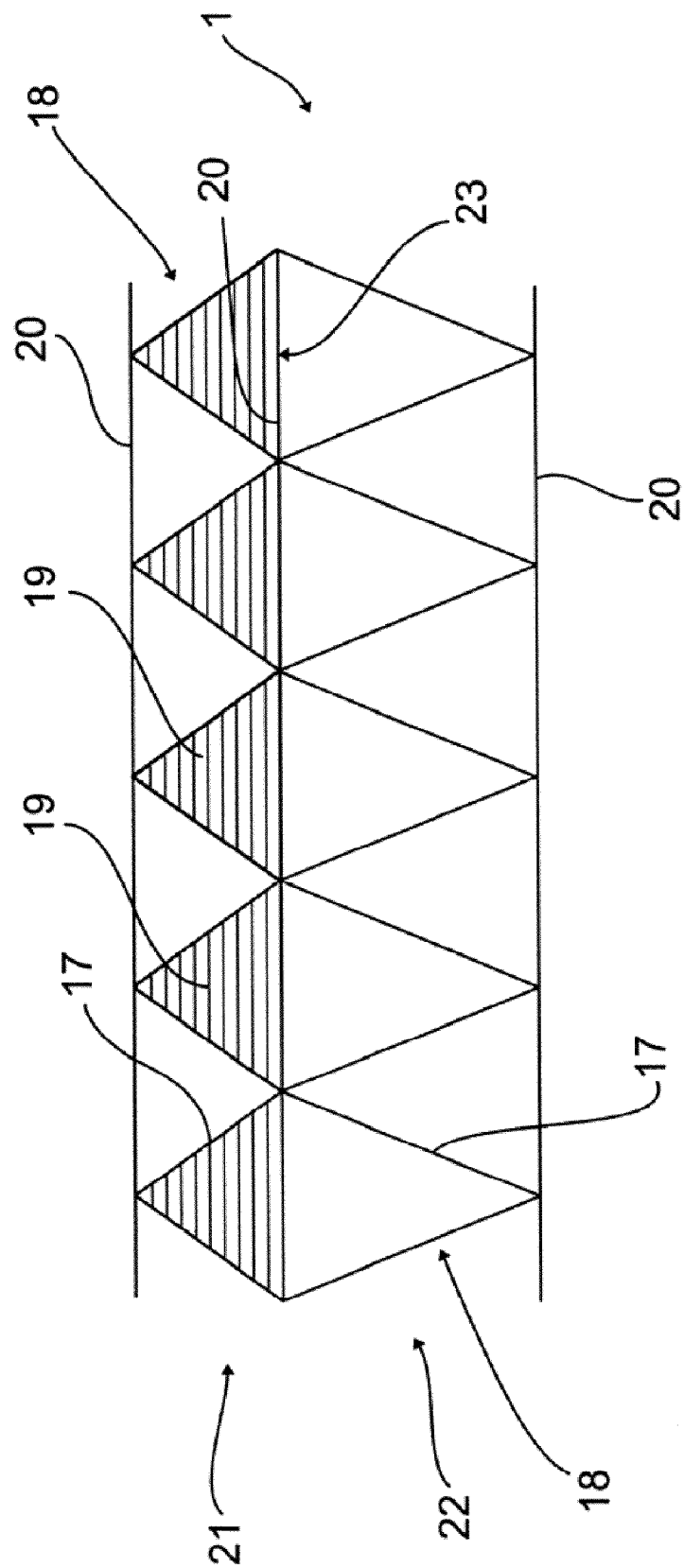
FIG. 3 is an illustration pursuant to FIG. 2, yet relative to a different section plane that shows constrictions or indentations.

The metal foils 17 that have a corrugated profile 18 can additionally, as viewed in the main direction of flow x, be provided with constrictions as indentations, which here, by way of example only, are equally spaced from one another. By means of these constrictions, the previously described clearance volume spaces, and hence flow interruptions, are configured in a particularly straightforward manner. In FIG. 3, this is illustrated with the aid of a different section plane than that of FIG. 2; here a portion of the upper channels are closed off by indentations 19. Upstream of these indentations 19, the flow must be deflected or shunted into adjacent channels via the flow-through openings 23 described in conjunction with FIG. 2.

Figure 4:
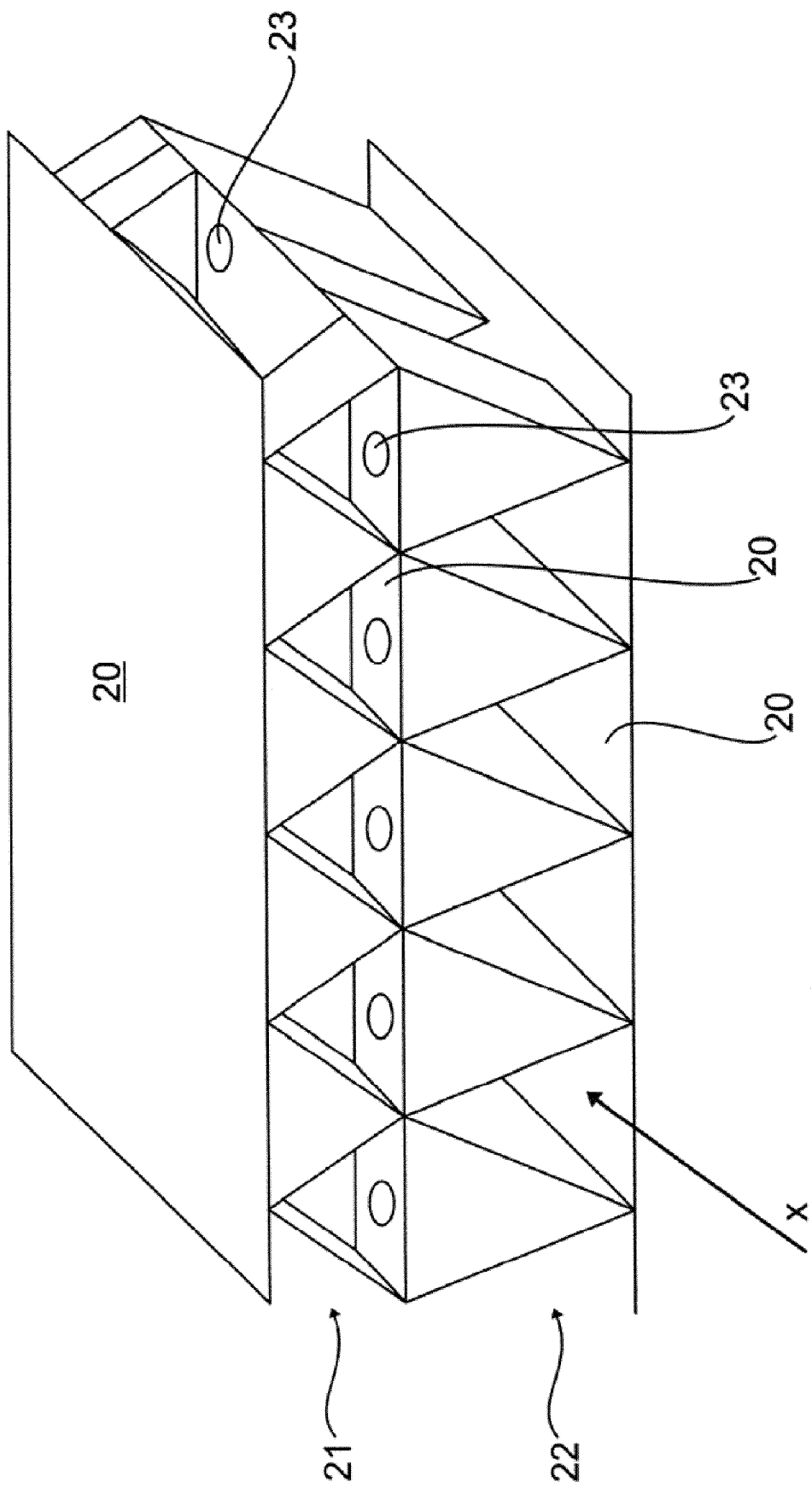
FIG. 4 is a perspective view of a portion of an exemplary embodiment of an inventive particle separator.

FIG. 4 shows a schematic, perspective illustration of a portion of an inventive separator that is comprised of two corrugated layers 21, 22 having interposed smooth layers 20. By means of flow-through openings 23 provided in the smooth layers 20, the gas stream, which is laden with particles, is alternatingly conveyed between the corrugated layer 21 having the lower amplitude, in other words greater flow velocity, and the corrugated layer 22 having the high amplitude, in other words the lower flow velocity. This takes place by an alternating closing off of the channels, for example by the above-described indentations of metal foils that form the corrugated layers 21, 22.

Figure 5:
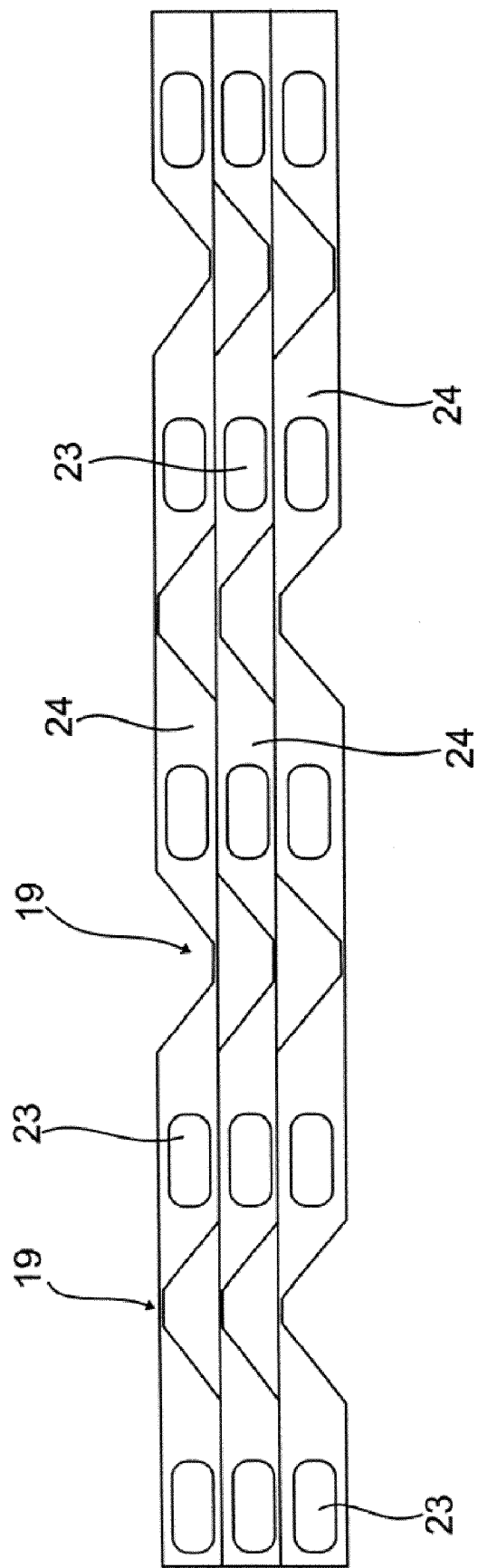
FIG. 5 is a schematic side view of a concrete particle separator formed by a plurality of corrugated metal plates.
Figure 6:
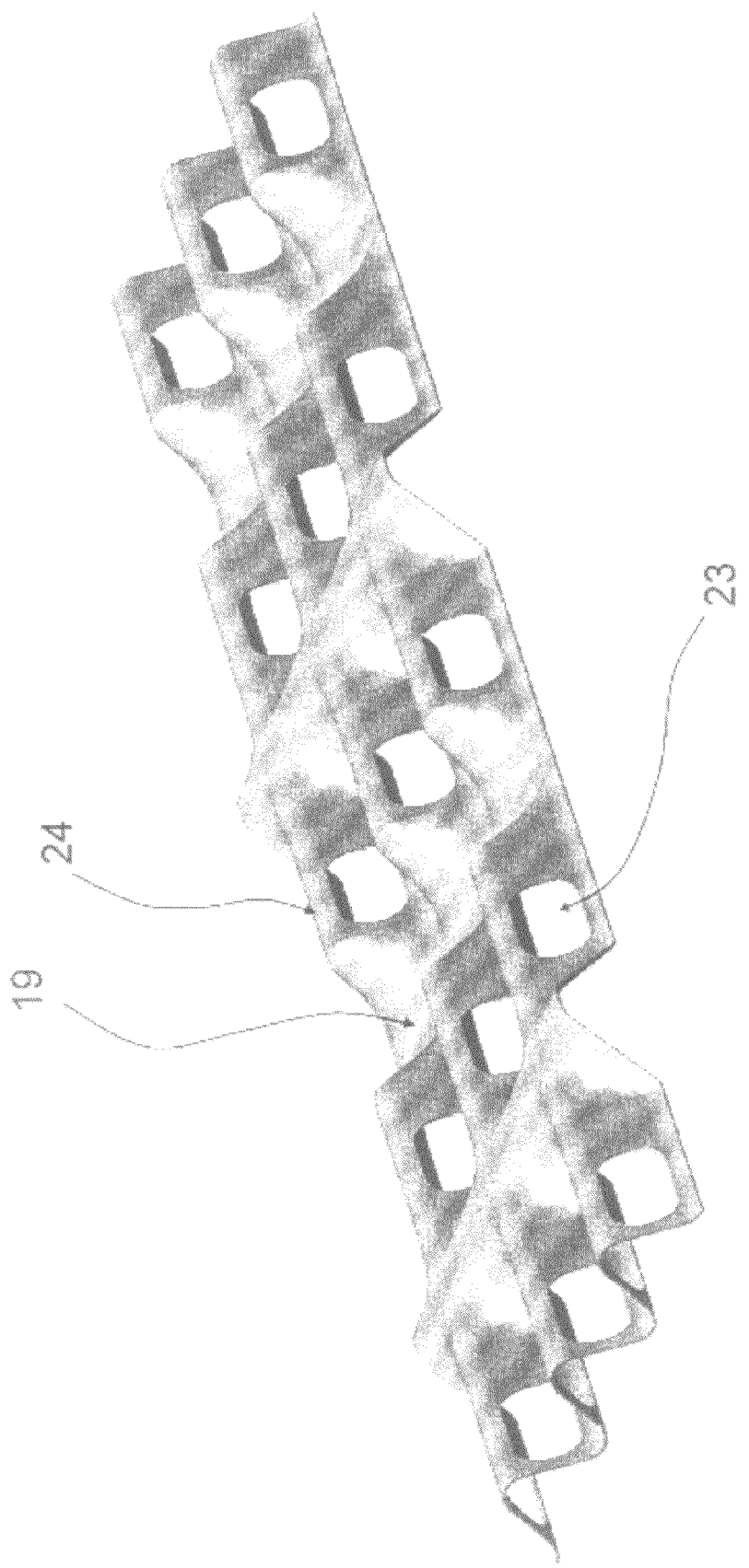
FIG. 6 is a perspective illustration of a single corrugated metal plate.

The schematic side view of FIG. 5 illustrates a set of corrugations that is here, by way of example only, formed by three superimposed corrugated metal plates 24 as separator plates; a single corrugated metal plate 24 is illustrated in FIG. 6. The individual flow-through openings 23 as well as the indentations 19 are very visible from these two illustrations. By appropriately varying the opening cross-sections of the flow-through openings 23, different flow profiles can be produced and realized. To facilitate illustration, the smooth layers that can be provided between the individual corrugated metal plates 24 are here not shown.

The specification incorporates by reference the disclosure of priority document DE 10 2008 029 520.5 filed 21 Jun. 2008.

The present invention is, of course, in no way restricted to the specific disclosure of the specification and drawings, but also encompasses any modifications within the scope of the appended claims.

What we claim is:

1. A particle separator for removing particles from an exhaust gas stream of an internal combustion engine, comprising:

a prescribed number of flow cells in said particle separator, wherein the exhaust gas stream flows into and/or out of said flow cells via, as viewed in a main direction of flow of the exhaust gas stream, side wall regions of said flow cells, further wherein at least one storage space is formed in said flow cells for storing particles removed from the exhaust gas stream, further wherein the exhaust gas stream is adapted to flow through at least portions of said particle separator, further wherein adjacent ones of said flow cells are in flow communication with one another and each have at least one common flow-through opening, in particular such that this common flow-through opening for one of said flow cells forms an intake opening and for the adjacent, other flow cell forms a discharge opening, further wherein one of said storage spaces of each of said flow cells is formed by at least one blind-end bore type clearance volume space, in particular by at least one blind-end bore type flow cell channel portion, further wherein said blind-end bore type clearance volume space, as viewed in a main direction of flow of the exhaust gas stream, is formed in at least a front end portion of each of said flow cells, further said blind-end bore type clearance volume space, as viewed in a main direction of flow of the exhaust gas stream, is disposed upstream and/or downstream of said at least one flow-through opening, and wherein said blind-end bore type clearance volume space is provided with a baffle base wall that is oriented essentially perpendicular to the main direction of flow of the exhaust gas stream.

2. A particle separator according to claim 1, which is provided with a plurality of flow cells that in particular, as viewed in a main direction of flow of the exhaust gas stream, are disposed one after the other and/or next to one another and/or one above the other.

3. A particle separator according to claim 2, wherein all of said flow cells are embodied essentially in the same manner, especially with regard to their configuration and/or size.

4. A particle separator according to claim 2, wherein said flow cells differ with respect to their flow conditions, in particular with regard to flow velocity and/or retention time of the exhaust gas stream in a respective one of said flow cells, for a separation of particles having a different defined order of magnitude and/or different defined mass in differing ones of said flow cells.

5. A particle separator according to claim 4, wherein said differing flow cells respectively have differently sized free flow cross-sections.

6. A particle separator according to claim 1, wherein each of said flow cells, in a prescribed side wall region, is provided with at least one flow-through opening that forms intake and/or discharge openings.

7. A particle separator according to claim 6, wherein said flow-through openings differ at least partially in shape and/or size.

8. A particle separator according to claim 6, wherein said flow-through openings and/or said flow cells and/or said storage spaces for said particles vary in shape and/or size along a main direction of flow of the exhaust gas stream.

9. A particle separator according to claim 6, wherein each of said flow cells has at least one separate intake opening via which an exhaust gas stream flows into said flow cell, and additionally has at least one separate discharge opening via which an exhaust gas stream flows out of said flow cell.

10. A particle separator according to claim 9, wherein said at least one intake opening of a flow cell, as viewed in a main direction of flow of the exhaust gas stream, is disposed upstream of said at least one discharge opening of that same flow cell.

11. A particle separator according to claim 10, wherein adjacent flow cells, as viewed in said main direction of flow, are offset relative to one another in such a way that a discharge opening of a first flow cell forms an intake opening of a second flow cell.

12. A particle separator according to claim 1, wherein at least in the area of said storage space, said flow cell is at least partially gas permeable, and wherein in particular prescribed wall portions, preferably a baffle base wall, are perforated and/or are made of a gas permeable material.

13. A particle separator according to claim 12, wherein said gas permeability is such that a prescribed quantity, preferably a maximum of 30%, of the exhaust gas stream of a flow cell flows out of said flow cell through said storage space.

14. A particle separator according to claim 1, further comprising means for repeatedly deflecting the exhaust gas stream in said particle separator and/or for dividing the exhaust gas stream into partial exhaust gas streams and/or for accelerating the exhaust gas stream and/or for slowing down the exhaust gas stream.

15. A particle separator according to claim 1, wherein at least portions of said particle separator are catalytically active, in particular being coated with a catalytic coating.

16. A particle separator according to claim 1, which is formed of a plurality of separator plates that are interconnected in superimposed layers and form a set of plates.

17. A particle separator according to claim 16, wherein individual ones of said separator plates are formed of foils and/or mats having a prescribed thickness.

18. A particle separator according to claim 16, wherein said separator plates are produced of at least one of the group consisting of metallic, ceramic, silicon-containing, silicon carbide-containing, quartz-containing and fiber-containing material.

19. A particle separator according to claim 18, wherein at least portions of said separator plates are provided with a surface structure having a prescribed roughness or peak to valley height.

20. A particle separator according to claim 16, wherein differing flow cross-sections or regions and/or deflection regions and/or collection regions and/or storage regions and/or flow-through openings are formed by material shaping and/or material recessing at prescribed regions of at least a portion of said separator plates of a set of plates.

21. A particle separator according to claim 1, which when viewed in cross-section has a honey-combed structure, and wherein each individual honeycomb thereof represents a flow cross-section of a specific section of a flow channel as viewed in a direction of flow.

22. A particle separator according to claim 16, wherein at least a portion of said separator plates of a set of plates has an essentially identical configuration.

23. A particle separator according to claim 16, wherein at least a portion of said set of plates is formed of separator plates that essentially transverse to a direction of flow has a corrugated or wavelike profile and forms a corrugated layer.

24. A particle separator according to claim 23, wherein said separator plates which form a corrugated layer are provided with constrictions, in particular in the form of indentations, wherein said constrictions are spaced from one another in the direction of flow, preferably being equidistantly spaced from one another, further wherein said constrictions extend essentially transverse to the direction of flow, and wherein said constrictions interrupt said corrugated profile and hence a longitudinal path of said flow channels that form said corrugated profile.

25. A particle separator according to claim 24, wherein a side portion of said separator plates, which form a corrugated layer, is provided upstream or downstream of each constriction with at least one flow-through opening for the exhaust gas stream.

26. A particle separator according to claim 24, wherein when viewed in the direction of flow, successive ones of said constrictions constrict said corrugated profile alternatingly first from one side and then from an opposite side.

27. A particle separator according to claim 23, wherein differing flow cross-sections are formed by different amplitudes and/or frequencies of said corrugated profile of at least one, and in particular a plurality of, differing separator plates.

28. A particle separator according to claim 23, wherein said set of plates is provided with planar separator plates that form a smooth layer and that preferably alternate with separator plates that form a corrugated layer.

29. A particle separator according to claim 1, wherein at least one of said particle separators, together with at least one catalytic converter, is disposed in a muffler of an exhaust gas unit.

* * * * *